United States Patent [19]
Sobhani

[11] Patent Number: 5,851,120
[45] Date of Patent: Dec. 22, 1998

[54] ROTARY CONDUIT/BALL CONNECTOR

[75] Inventor: Mohi Sobhani, Encino, Calif.

[73] Assignee: Raytheon Company, El Segundo, Calif.

[21] Appl. No.: 806,363

[22] Filed: Feb. 27, 1997

[51] Int. Cl.⁶ .................................................. H01R 39/22
[52] U.S. Cl. .................................................. 439/17; 439/13
[58] Field of Search ................................. 439/17, 19, 22, 439/27, 3

[56] References Cited

U.S. PATENT DOCUMENTS

| | | | |
|---|---|---|---|
| 2,502,252 | 3/1950 | Faile | 439/17 |
| 2,832,056 | 4/1958 | Stutzman | 439/3 |
| 3,501,204 | 3/1970 | Schreffler | 439/17 |
| 5,575,664 | 11/1996 | Sobhani | 439/17 |

*Primary Examiner*—Neil Abrams
*Assistant Examiner*—Eugene G. Byrd
*Attorney, Agent, or Firm*—Colin M. Raufer; Leonard A. Alkov; Glenn H. Lenzen, Jr.

[57] ABSTRACT

A rotary connector that transfers electrical power and signals using conductive metallic balls confined by a nonmetallic spacer and conductive conduits that are formed on two opposed metal-backed printed wiring boards. The rotary connector transfers electrical signals and power from a stationary printed wiring board to a moving printed wiring board by way of the conductive balls disposed in some or all openings of the conductive conduits. Nonconductive balls may be used in some of the openings. The use of a relatively large number of balls disposed in the openings of the nonmetallic spacer mechanically balance the connector. The connector is sealed and its interior contains nonconductive lubricant to lubricate the balls and conduits.

7 Claims, 2 Drawing Sheets

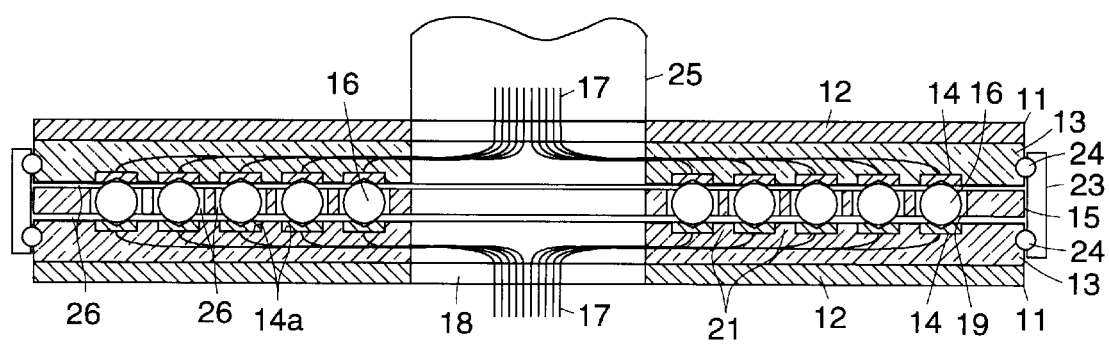
Fig. 1
Fig. 2
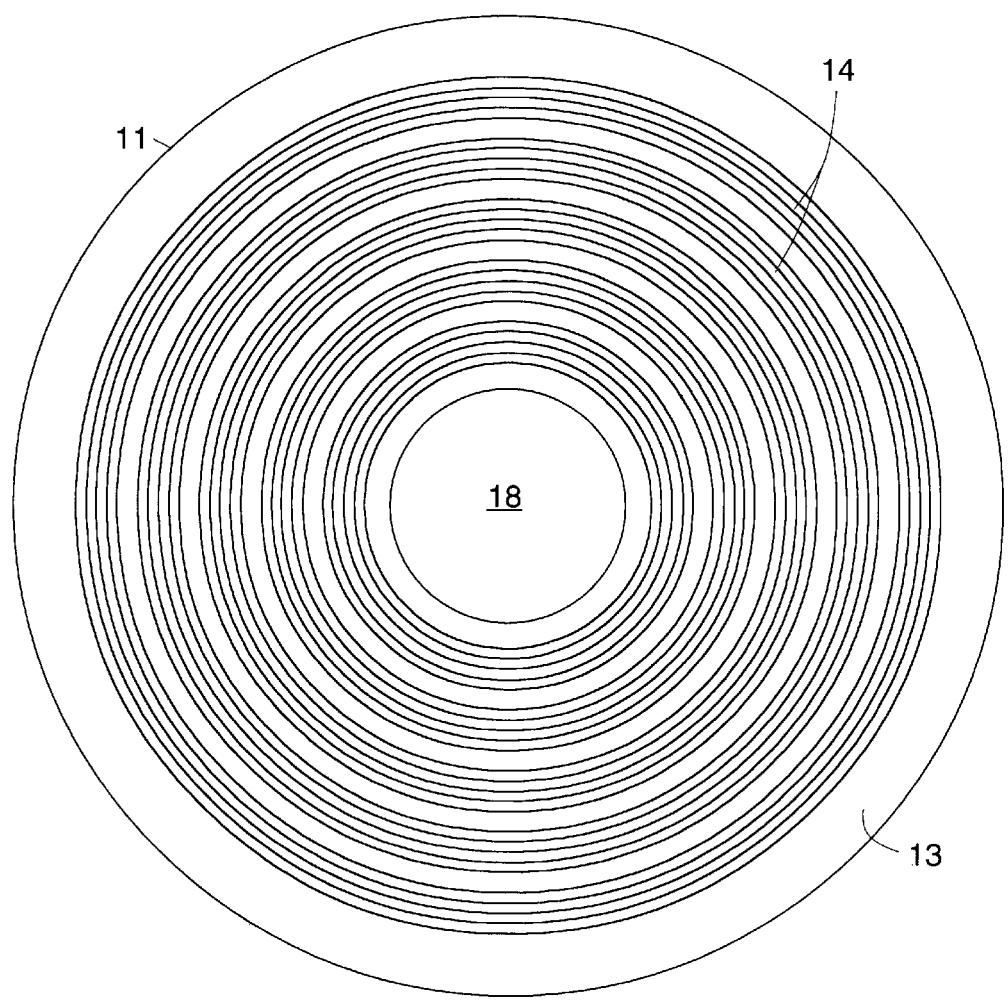

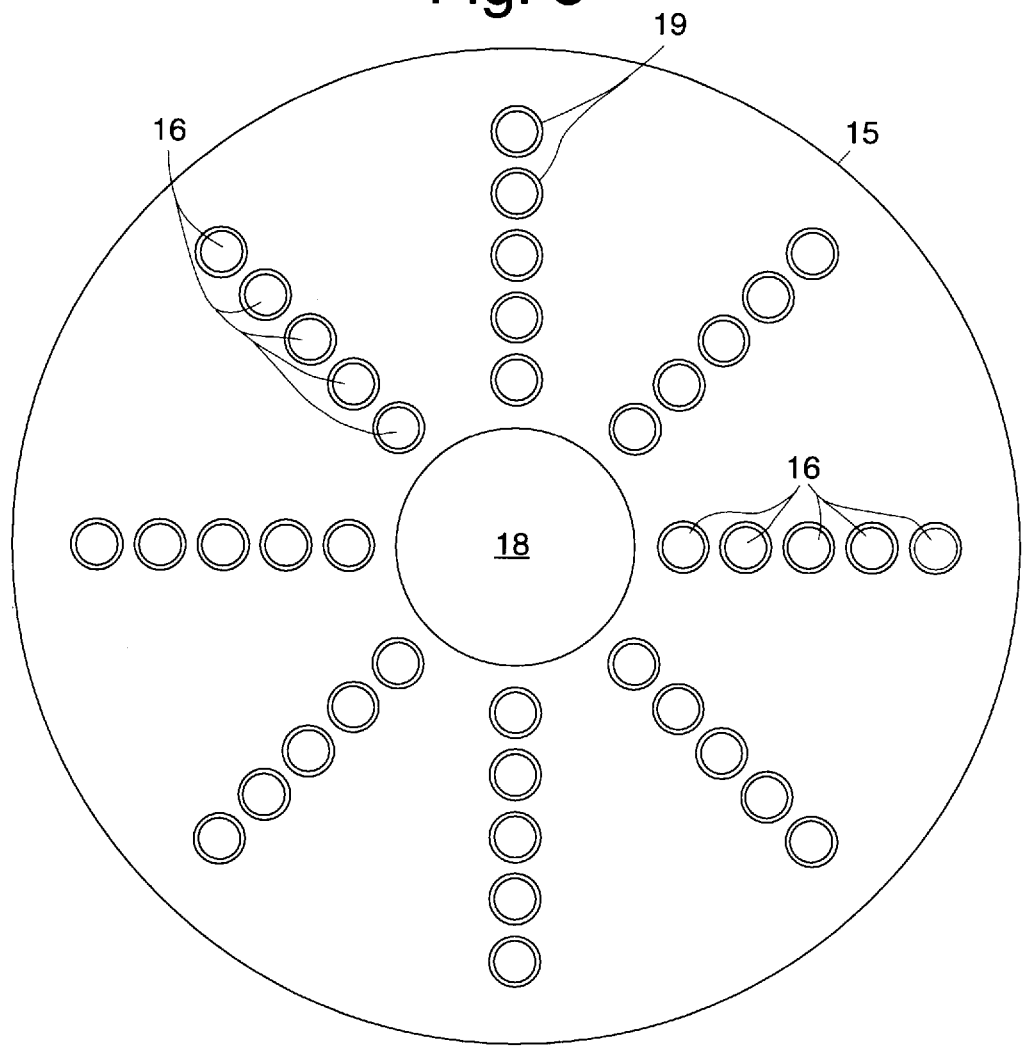

ROTARY CONDUIT/BALL CONNECTOR

BACKGROUND

The present invention relates generally to rotary connectors, and more particularly, to a rotary connector that uses conductive conduits or metalized grooves with mating conductive balls that conduct electricity between moving and stationary portions of the connector.

Conventional rotary connectors employ the use of cable-wrap connectors, slip rings, roll rings, brushes and motors, and telephone wire coils. The disadvantages of conventional rotary connector designs are as follows. Cable-wrap connectors have low reliability. Slip rings have low reliability and have an unworkable geometry. Roll rings are costly and have an unworkable geometry. Brush and motor designs are not applicable to the design of rotary connectors, and are expensive. Similarly, telephone wire coils are bulky, and are not generally applicable to the design of rotary connectors.

To overcome the limitations of these conventional rotary connectors, the assignee of the present invention has developed various rotary connectors that provide a more reliable and low cost alternative to conventional rotary connectors. Such rotary connectors are disclosed in U.S. Pat. No. 5,575,664, entitled "Ball Contact Rotary Connector", and U.S. patent application Ser. No. 08/680,075, filed Jul. 15, 1996, entitled "Spring Loaded Rotary Connector", for example, all of which are assigned to the assignee of the present invention. The present invention is an improvement over these rotary connectors.

Accordingly, it is an objective of the present invention to provide for a rotary connector employing conductive conduits and mating conductive balls that conduct electricity between moving and stationary printed wiring boards of the connector.

SUMMARY OF THE INVENTION

To meet the above and other objectives, the present invention provides for a rotary connector that transfers electrical power and signals using electrically conductive metallic balls confined by openings in a nonmetallic spacer and conductive conduits that are formed on two opposed metal-backed printed wiring boards. A plurality of nonconductive balls may be disposed in some of the openings in the nonmetallic spacer. The conductive balls and/or conductive and nonconductive balls in conjunction with the locations of the openings in the nonmetallic spacer mechanically balance the connector.

The rotary connector transfers electrical signals and power from a stationary printed wiring board to a moving printed wiring board by way of the metallic balls and conductive conduits. The rotary connector is sealed and the interior thereof contains nonconductive lubricant to lubricate the balls and conduits.

The rotary connector has an extremely thin pancake design. The rotary connector has an extremely thin profile, the components thereof are easily interchanged, the rotary connector exhibits high reliability, and has a relatively small number of components compared to conventional connectors.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 shows a cross sectional view of a rotary connector in accordance with the principles of the present invention; and FIG. 2 shows a top view of the printed wiring boards used in the rotary connector of FIG. 1; and FIG. 3 shows a top view an insulating member that confines the conductive balls used in the rotary connector of FIG. 1.

DETAILED DESCRIPTION

Referring to the drawing figures, FIG. 1 shows a cross-sectional view of a rotary connector 10 in accordance with the principles of the present invention. The rotary connector 10 comprises first and second substantially identical opposed metal-backed printed wiring boards 11 that are generally axially aligned with each other. Each of the metal-backed printed wiring boards 11 has a dielectric layer 13 that has a metal backing layer 12 to make is substantially rigid. A plurality of concentric conductive conduits 14 are formed in or on one surface of each of the printed wiring boards 11. The conductive conduits 14 may be disposed in grooves 14a formed in the surface of the printed wiring boards 11. Alternatively, the conductive conduits 14 may be disposed on the surface of the printed wiring boards 11 and an insulating filler material 21 may be employed to separate the respective conduits 14. The conductive conduits 14 and the backing layer 12 may comprise beryllium copper or other conductive metal.

A plurality of electrical conductors 17 that may comprise electrical traces and/or wires are coupled to selected ones of the conduits 14. The conductive conduits 14 are typically circular, but may also be segmented into a plurality of sections to provide for a multiplicity of electrical paths through the connector 10. Conductive balls 16 are disposed in each conduit 14 or section conduit 14. The use of a large number of conductive balls 16 mechanically balances the connector 10. The conductive balls 16 may comprise beryllium copper or other conductive metal.

The respective printed wiring boards 11 are secured together in a conventional manner, such as by screws (not shown) so that pressure is exerted on the printed wiring boards 11 to provide an appropriate amount of contact between the conductive conduits 14 and the conductive balls 16 disposed therebetween. A central opening 18 is provided through which an axial shaft 25 is disposed.

The respective metal-backed printed wiring boards 11 are disposed so that the conduits 14 face each other. A nonmetallic spacer 15 is disposed between the respective printed wiring boards 11. The nonmetallic spacer 15 may be comprised of a dielectric material such as phenolic, for example. The nonmetallic spacer 15 has a plurality of openings 19 therein that captivate a plurality of conductive balls 16. The openings 19 or holes 19 and conductive balls 16 are generally aligned with the centers of corresponding conduits 14 of each of the printed wiring boards 11 that they contact. The rotary connector 10 is sealed in a conventional manner using a sealing member 23 having a plurality of O-ring seals 24, for example. The interior of the rotary connector 10 contains nonconductive lubricant 26 that lubricates the conductive balls 16 and conduits 14. A nonconductive lubricant 26 known as PRO-4 W/05% BHT 3% PBNT available from Nye Corporation may be used.

Referring to FIG. 2, it shows a top view of the printed wiring boards 11 used in the rotary connector 10. The adjacent surfaces of each printed wiring board 11 have the plurality of conduits 14 formed therein. The plurality of conduits 14 may be fabricated as V-shaped or U-shaped grooves 14, for example. The conduits 14 or grooves 14 operate to confine the lateral movement of the conductive balls 16 when the printed wiring boards 11 of the connector 10 rotate relative to each other, and ensures electrical integrity.

FIG. 3 shows a top view the insulating member 15 that confines the conductive balls 16 used in the rotary connector 10. Each of the conductive balls 16 are confined by the individual openings 19 or holes 19 through the insulating member 15. Although the present connector 10 uses conductive balls 16 disposed in each of the holes 19 of the nonmetallic spacer 15, it is to be understood that nonconductive balls 16 may be used in some or most of the holes, if desired, as long as electrical contact is made using at least one conductive ball 16 in each set of opposed conduits 14. However, it has been found that the use of conductive balls 16 in all of the openings 19 of the nonmetallic spacer 15 provides the best electrical performance.

Thus, an improved rotary connector employing conductive conduits and mating conductive balls that conduct electricity between moving and stationary printed wiring boards of the connector has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention. For example, the above-described arrangement of opposed printed wiring boards separated by a nonmetallic spacer and interconnected by conductive balls may be stacked together along a shaft to provide a rotary connector with additional electrical paths.

What is claimed is:

1. A rotary connector comprising:

first and second printed wiring boards that each comprise a dielectric layer having a metal backing layer, and a plurality of concentric conductive conduits disposed adjacent one surface of the dielectric layer, and wherein the conduits of the respective printed wiring boards face each other;

a plurality of electrical conductors coupled to selected ones of the conduits;

a nonmetallic spacer disposed between the respective printed wiring boards having pluralities of openings therein that are aligned with the respective conduits of the printed wiring boards;

a plurality of conductive balls disposed in a selected plurality of openings of the nonmetallic spacer that contact opposed conduits of the respective printed wiring boards;

a sealing member for sealing the rotary connector; and nonconductive lubricant disposed within the rotary connector that lubricates the conductive balls and conduits.

2. The connector of claim 1 wherein the conductive conduits are disposed in grooves formed in the surface of each printed wiring board.

3. The connector of claim 1 wherein the conductive conduits are disposed on the surface of each printed wiring board and an insulating filler material is disposed therebetween to separate the respective conduits.

4. The connector of claim 1 wherein the conductive conduits are segmented into a plurality of sections to provide for a multiplicity of electrical paths through the connector.

5. The connector of claim 1 wherein the conductive conduits comprise beryllium copper.

6. The connector of claim 1 wherein the conductive balls comprise beryllium copper.

7. The connector of claim 1 wherein a selected plurality of the openings in the nonmetallic spacer confine a plurality of nonconductive balls.

\* \* \* \* \*